United States Patent
Xue

(10) Patent No.: US 7,113,869 B2
(45) Date of Patent: Sep. 26, 2006

(54) METHOD FOR PROSPECT IDENTIFICATION IN ASSET EVALUATION

(75) Inventor: Fangjian Xue, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 117 days.

(21) Appl. No.: 10/852,409

(22) Filed: May 24, 2004

(65) Prior Publication Data
US 2005/0015204 A1    Jan. 20, 2005

Related U.S. Application Data

(60) Provisional application No. 60/472,620, filed on May 22, 2003.

(51) Int. Cl.
*G01V 1/28*    (2006.01)
(52) U.S. Cl. .................. 702/9; 702/13; 702/14
(58) Field of Classification Search .......... 702/9, 702/12–14, 16, 17; 703/10; 367/73
See application file for complete search history.

(56) References Cited

U.S. PATENT DOCUMENTS

| 5,373,486 | A | * | 12/1994 | Dowla et al. ............... 702/17 |
| 5,444,619 | A | * | 8/1995 | Hoskins et al. ............. 702/13 |
| 5,475,589 | A |  | 12/1995 | Armitage |
| 6,223,126 | B1 |  | 4/2001 | Neff et al. |
| 6,236,942 | B1 | * | 5/2001 | Bush ............................ 702/14 |
| 6,374,185 | B1 | * | 4/2002 | Taner et al. .................. 702/14 |
| 6,411,903 | B1 | * | 6/2002 | Bush ............................ 702/14 |
| 6,549,879 | B1 | * | 4/2003 | Cullick et al. ............... 703/10 |
| 6,574,565 | B1 | * | 6/2003 | Bush ............................ 702/14 |
| 6,587,791 | B1 |  | 7/2003 | Dublin et al. |
| 6,735,526 | B1 |  | 5/2004 | Meldahl et al. |
| 6,957,146 | B1 | * | 10/2005 | Taner et al. .................. 702/14 |

FOREIGN PATENT DOCUMENTS

WO    WO 01/33255    5/2001

OTHER PUBLICATIONS

M. Nikravesh et al., "Soft Computing: Tools for Intelligent Reservoir Characterization (IRESC) and Optimum Well Placement (OWP)," *J. Petroleum Science and Engineering* 29, pp. 239-262 (2001).
O. Voutay et al., "Seismic Interpretation with New Attributes extracted from a Prestack Multicube Analysis," *SEG Int'l Exposition and 72nd Meeting* XP-002299246, Salt Lake City, Ut (oCT. 6-11, 2002).

* cited by examiner

*Primary Examiner*—Donald McElheny, Jr.
(74) *Attorney, Agent, or Firm*—Osha Liang LLP

(57) ABSTRACT

3D seismic classification is a breakthrough technology to determine the three-dimensional distribution of pore fluid, lithology, and faults/fractures from multiple seismic attribute volumes. This method provides an innovative, timesaving solution for identification and definition of drilling targets, especially in areas with multiple pay zones and complex geology.

10 Claims, 7 Drawing Sheets

1 Oil sand bright spot
2 Oil sand non - bright spot
3 Gas sand bright spot
4 Wet sand bright spot
5 Wet sand non - bright spot
6 Shale

FIG. 3

| | | |
|---|---|---|
| 1 |  | Oil sand bright spot |
| 2 |  | Oil sand non - bright spot |
| 3 |  | Gas sand bright spot |
| 4 |  | Wet sand bright spot |
| 5 |  | Wet sand non - bright spot |
| 6 |  | Shale |
| 7 |  | Low Risk HC Sand |

METHOD FOR PROSPECT IDENTIFICATION IN ASSET EVALUATION

RELATED APPLICATIONS

This application claims benefit of priority from U.S. Provisional Application No. 60/472,620, filed 22 May 2003 and entitled IDENTIFYING PROSPECTIVE TARGETS, which is incorporated by reference herein.

FIELD OF THE INVENTION

The present invention relates in general to the field of seismic data interpretation and, more specifically, to the determination of 3D distribution of pore fluid and lithology from multiple seismic attribute volumes for identifying prospects in asset evaluation.

BACKGROUND

Identification of prospective targets for hydrocarbon exploration and production opportunities in asset evaluation generally requires months of seismic interpretation to tie well production zones, interpret the horizons of interest, extract and analyze seismic attributes corresponding to petrophysical properties, and assess the potential and risks.

Generally in traditional seismic interpretation, one or more seismic events are identified and tracked to yield a set of seismic horizons. These horizons are used to form a structural framework of the subsurface in two-way time, or depth. Subsequent geological modeling and most of today's seismic inversion schemes rely on this framework. For example, seismic attributes can be extracted around an interpreted horizon and used to characterize a reservoir unit.

Very often, utilizing prior art seismic interpretation methods, it may take a year for a new player to define the top recompletion, infill and exploration opportunities in a field with a large number of productive horizons. Successfully unlocking these opportunities depends on whether or not explorationists can significantly reduce cycle time, increase efficiency and lower risk in defining drilling targets. In meeting this challenge, an innovative approach has been developed to effectively identify prospective targets during asset evaluation.

Therefore, it is a desire to provide a 3D seismic classification method for identifying prospective targets. It is a further desire to provide a 3D seismic classification method that reduces cycle time, increases efficiency and lowers the risk in defining drilling targets. It is a still further desire to provide a 3D seismic classification method that reduces the time for identifying and defining drilling targets, especially in areas with multiple pay zones and complex geology, from months to a matter of weeks.

SUMMARY OF THE INVENTION

In view of the foregoing and other considerations, the present invention relates to the field of seismic data interpretation and, more specifically, to the determination of 3D distribution of pore fluid and lithology from multiple seismic attribute volumes for identifying prospects in asset evaluation.

Accordingly, a 3D seismic classification method is provided for identifying and defining prospective drilling targets. The method may include the steps of generating seismic attribute cubes for a seismic volume of interest, defining fluid-lithology classes, training a neural network using the seismic attribute cubes at well ties, generating a cross-plot of training samples, defining at least one extra class as a low-risk hydrocarbon class, generating a class cube providing the spatial distribution of each the fluid-lithology classes and the at least one extra-class, and selecting drilling targets.

3D seismic classification is a breakthrough technology to determine the three-dimensional distribution of pore fluid, lithology, and faults/fractures from multiple seismic attribute volumes. This method provides an innovative, timesaving solution for identification and definition of drilling targets, especially in areas with multiple pay zones and complex geology.

A supervised classification method is used to define classes of fluid and lithofacies based on knowledge of well production, lithology and seismic amplitude. Using cross-plot discriminant analysis, an extra class or extra classes may be defined based on their cluster distribution, separating classes based on their degree of risk. Generated class cubes provide the location of prospective targets and the associated probability cubes provide quantitative estimation of risk. 3D visualization techniques vividly display the distribution of fluid and lithofacies and also provide the volume-percentages of different classes, which is important for quality control. Multiple attribute 3D seismic classification analysis identifies top drilling targets in a matter of weeks instead of months.

As with any seismic assessment, a rapid 3D seismic assessment begins with gathering available data, including seismic volumes, logs, and engineering data. The seismic volumes may include the final migrated cube, offset stack (AVO), volumes of variance or coherency cube, and multiple attributes cubes. More detailed analysis on the targeted areas determine if the geobodies are hydrocarbon bearing.

Multiple attributes are displayed and cross-correlated to determine which are redundant. In the supervised mode, reference data or training data for each output class typically come from well data such as, but not limited to, porosity, saturation, lithology, and pore fluid. Once identified, the lithofacies and fluid types serve as training data to look for similar patterns within the larger seismic volume.

The 3D seismic classification method of the present invention provides an efficient way to analyze multiple reservoir zones and/or complex geologic settings without interpreting horizons, as is done when using the traditional horizon-based approach alone. One of several neural network algorithms use multiple seismic attribute cubes for classification. Well logs and production data are used to provide training sets. Multidimensional cross-plots show all of the various training data according to their lithology/pore fluid classes and allows the identification of low-risk hydrocarbon reservoirs in attribute space. The 3D classification cube, "class cube", provides a spatial distribution of lithology and fluid classes following the same labeling scheme of fluid-lithology classes. A Voxel interpretation of the prospective targets in the 3D classification cube allows their delineation in plan view, in terms of location and areal extent. The inclusion of existing well bores delineates whether prospects are recompletion, infill, or exploration opportunities.

The rapid 3D seismic classification method of the present invention, in conjunction with economics, risk, and decision analyses, can be a powerful tool for oil and gas companies, particularly when informed decisions are need quickly. These combined tools can be used for purposes such as quick ranking of prospects, better well placement, timely assessment of field value, and optimizing field development solutions.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein:

FIG. 3 is an illustration of the original fluid-lithology classes defined, and labeled, from the well logs and production data;

DETAILED DESCRIPTION

Figure 1:
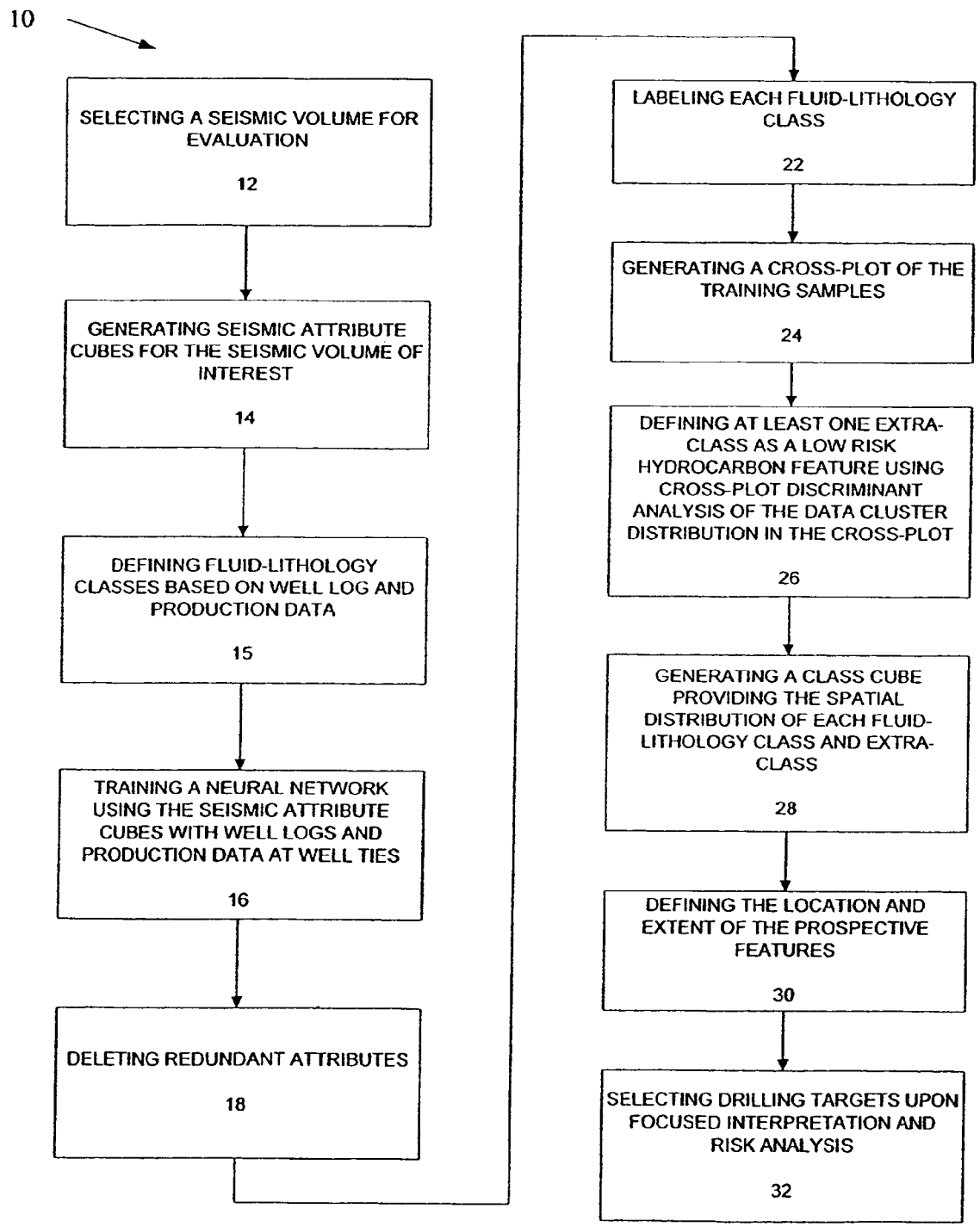
FIG. 1 is a flow diagram of a 3D seismic classification method for prospect identification in asset evaluation of the present invention.

Refer now to the drawings wherein depicted elements are not necessarily shown to scale and wherein like or similar elements are designated by the same reference numeral through the several views.

FIG. 1 is a flow diagram of a 3D seismic classification method for prospect identification in asset evaluation of the present invention generally designated by the numeral 10.

The first step 12 in the 3D classification method 10 is to select a seismic volume for evaluation. For purpose of description and understanding of the various Figures, an existing seismic cube covering two hydrocarbon fields in onshore South Louisiana is chosen for illustration of the present method. The seismic cube covers approximately fifty square miles surrounding the two existing fields. Production is predominantly oil with more than 30 production zones ranging in depth from 8,000 feet to 13,500 feet. 3D classification method 10 is utilized to identify top prospective targets within and adjacent to this field.

In step 14, seismic attribute cubes are generated for the seismic volume of interest. These attributes are obtained by conventional seismic attribute generation methods. Hundreds of seismic attributes are available nowadays. Examples of common attributes utilized include, but are not limited to, Volume Reflection Spectrum (VRS) proprietary to Schlumberger Technologies, that utilizes several cubes using center of gravity or sum of coefficients method with filter lengths from 2 to 21 samples; Amplitude Versus Offset (AVO) attributes that include far amplitude minus near amplitude, gradient, and the product of far amplitude minus near amplitude and the far amplitude; traditional (Hilbert Transform) attributes such as reflection magnitude, instantaneous frequency, instantaneous phase, and cosine of instantaneous phase; variance; geometric attributes such as dip; and concatenated attributes.

In step 15, fluid-lithology classes are defined based on the well log and production data. As shown in FIG. 3, the original fluid lithology classes are defined as "oil sand bright spot" 1, "oil sand nonbright spot" 2, "gas sand bright spot" 3, "wet sand bright spot" 4, "wet sand nonbright spot" 5, and "shale" 6. Each of the fluid-lithology classes is further shown on FIG. 2.

Figure 2:
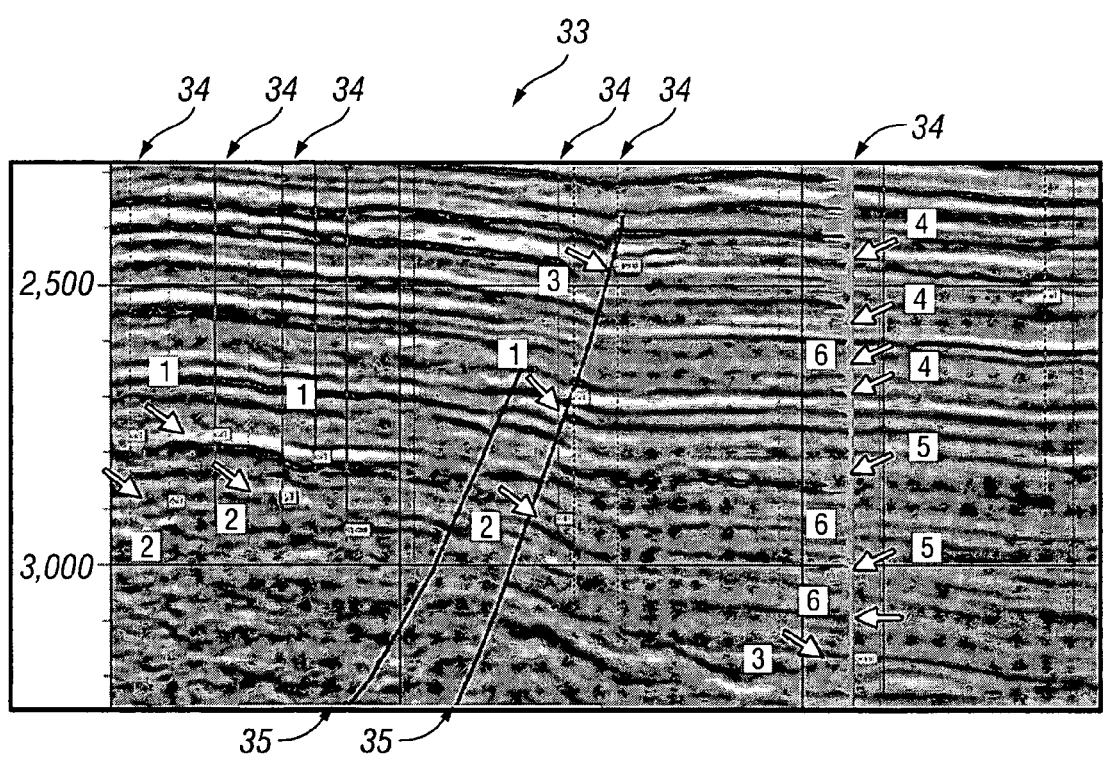
FIG. 2 is seismic section with well paths, sample well logs, and marked oil and gas production zones indicating training points selected.

In step 16, a neural network is trained using seismic attribute cubes with well log and production data utilizing a supervised learning approach. FIG. 2 illustrates a seismic section with well paths 34, well logs, and marked oil and gas production zones. The arrows indicate positions where training points have been picked. FIG. 2 also identifies faults 35.

It may be desired to label each of the fluid-lithology classes (step 22) with a color for readily identifying each class.

Upon evaluation of the seismic attribute cubes it may be recognized that some attributes better match the well log and production data better than others or more clearly illustrate seismic trends, or provide redundant representations of the seismic volume. Therefore, it is often desired to eliminate or delete these attributes, step 18. This elimination of attributes can be done through out the 3D seismic classification 10 method. It is desirable to reduce the number of seismic attribute cubes before the cross-plotting step 24.

Figure 4:
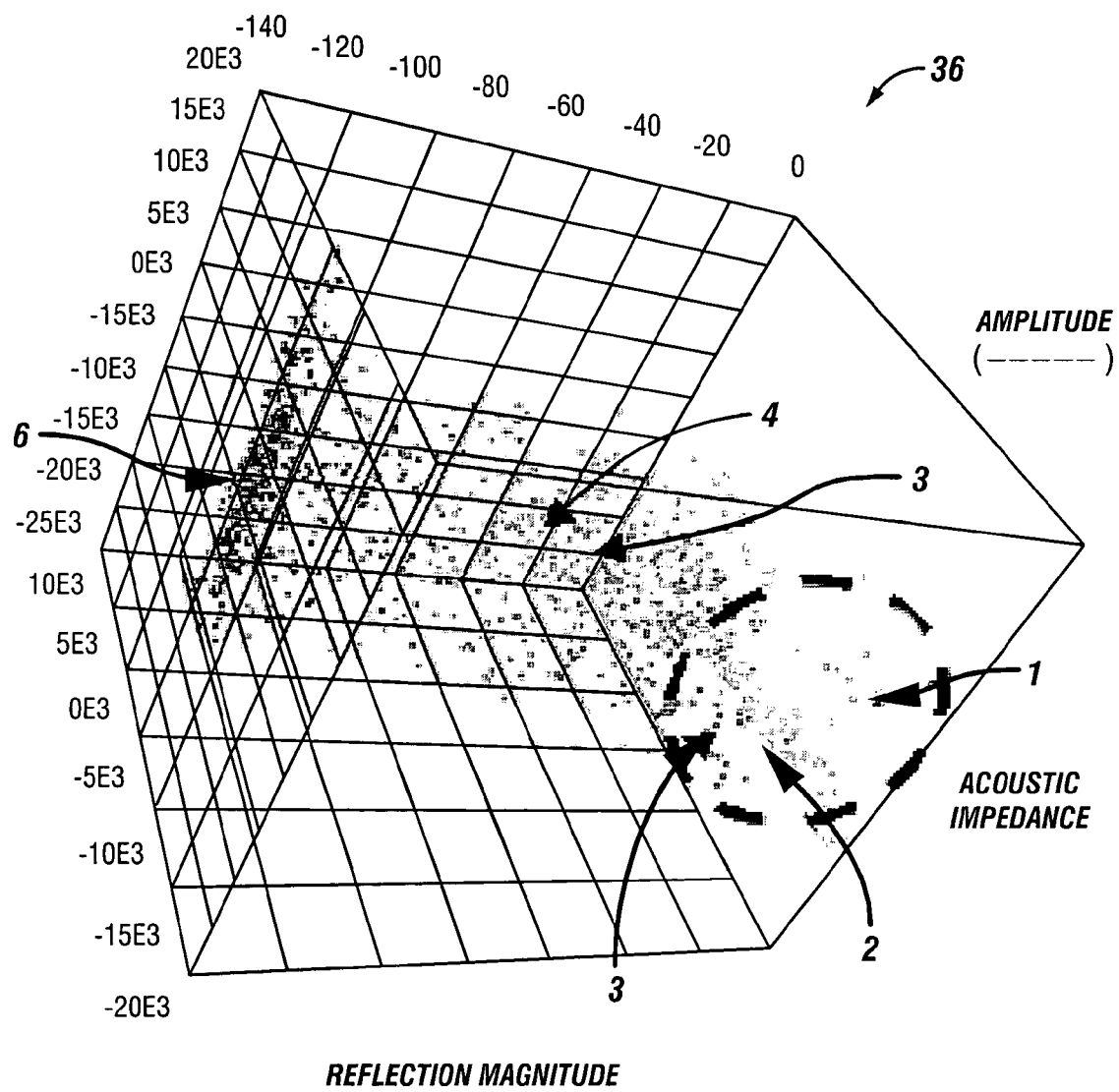
FIG. 4 is a sample cross-plot of training samples showing seismic samples amplitude, acoustic impedance, and reflection magnitude.

In step 24, a cross-plot of the training samples is generated. Depending on the number of seismic attribute cubes utilized several cross-plots may be generated. FIG. 4 is a cross-plot 36 of training samples. As shown, cross-plot 36 includes seismic attribute cubes for amplitude, acoustic impedance and reflection magnitude. The seismic attribute cubes utilized for the cross-plot 36 are determined through an iterative process by the operator. Cross-plot 36 produces clusters of data identified by the labeling for the fluid-lithology classes shown in FIG. 3. Color labeling of the fluid-lithology classes more clearly illustrates the cluster distribution of the fluid-lithology classes.

Figure 5:
FIG. 5 is a an illustration of the original fluid-lithology classes defined, and labeled, from the well logs and production data and the extra-class low-risk hydrocarbon zone defined and labeled.
Figure 5:
Figure 5:
Figure 5:
Figure 5:
Figure 5:
Figure 5:

Utilizing cross-plot discriminant analysis, a low-risk hydrocarbon zone 7 is defined based on the data cluster distribution. For example, low-risk hydrocarbon zone 7 indicates no shale or wet sands. The new class for a low-risk hydrocarbon bearing zone is then labeled, preferably by color coding, as shown in FIG. 5.

Figure 6:
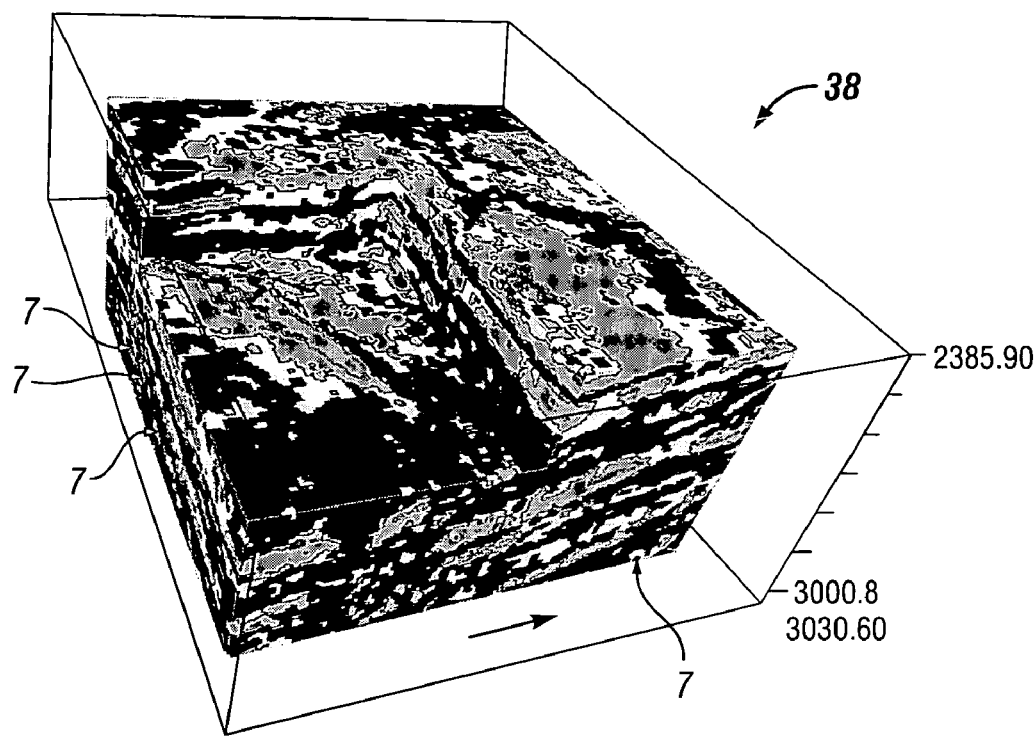
FIG. 6 is a generated class cube showing the spatial distribution of different fluid-lithology classes and the extra-class.

In step 28, a class cube 38 is generated providing the spatial distribution of each fluid-lithology class and the at least one extra-class. FIG. 6 is an illustration of class cube 38. It should be recognized that class cube 38 is calibrated to the well ties and the well log and production data. In real time, it is desired that each of the fluid-lithology classes be identified by color labels.

Figure 7:
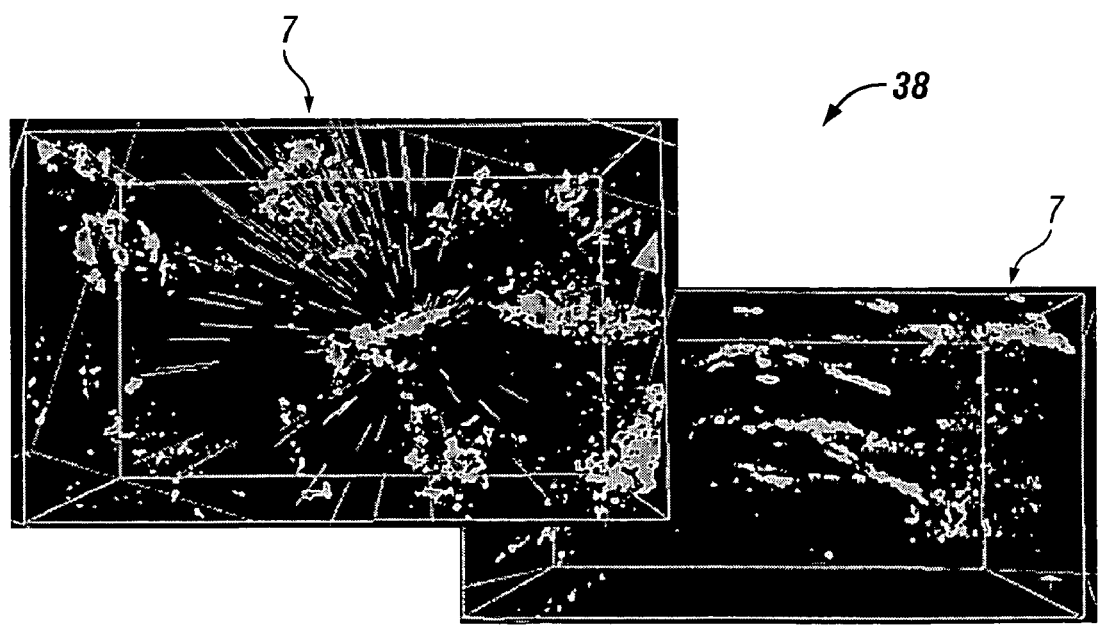
FIG. 7 is a 3D visualization of the class cube with opacity settings set to reveal the spatial distribution of the low-risk hydrocarbon class for Voxel interpretation.
Figure 8:
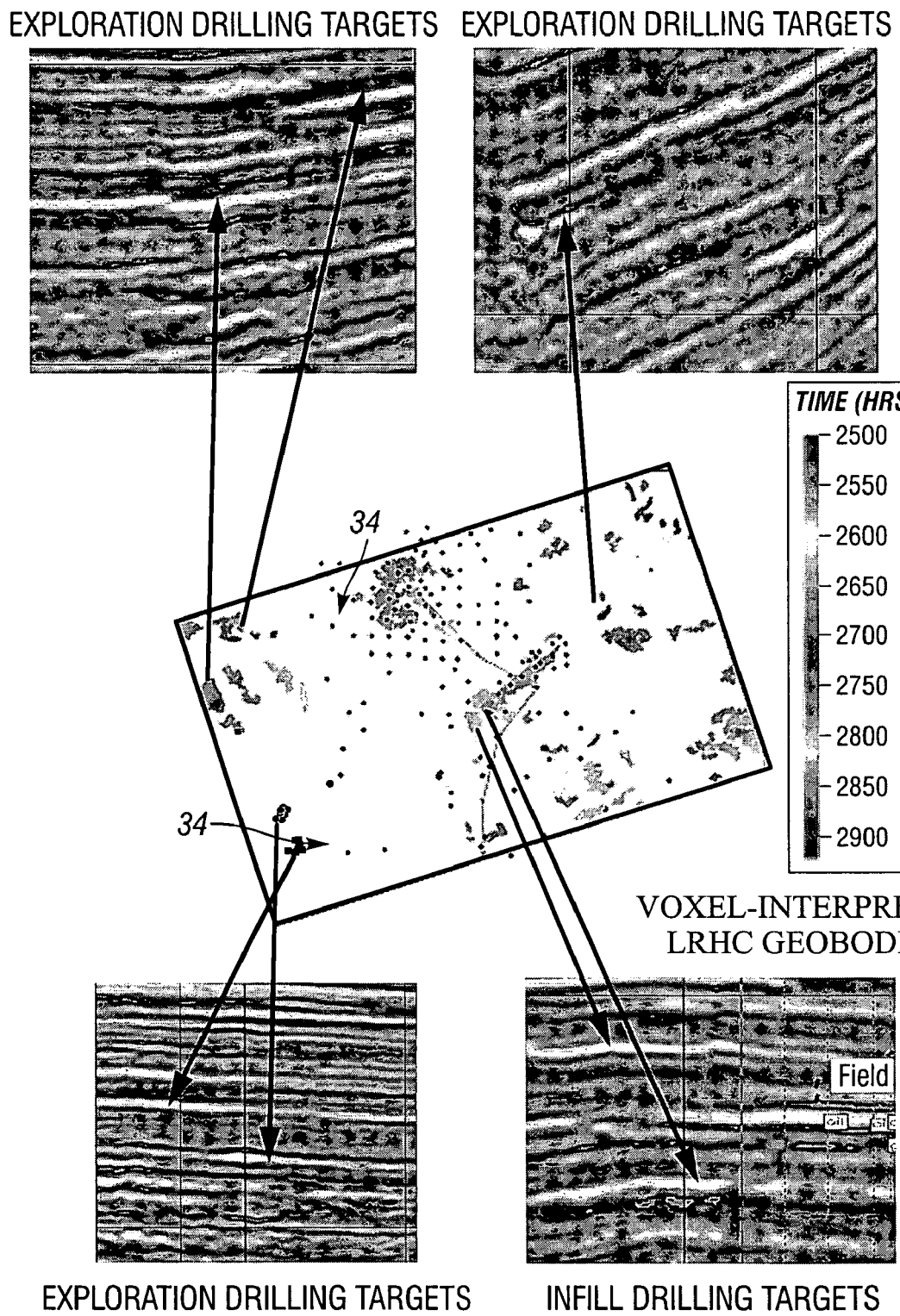
FIG. 8 is an illustration of the results of Voxel interpretation of the low-risk hydrocarbon zone class.

FIG. 7 is a 3D visualization of class cube 38 to reveal the spatial distribution of the low-risk hydrocarbon zone class 7. 3D visualization aids an interpreter in rapidly assessing the spatial distribution of the prospective targets, step 30. FIG. 8 shows the results of a Voxel interpretation of the low-risk hydrocarbon zone 7 class. In step 32, the interpreter may select relevant low-risk targets.

From the foregoing detailed description of specific embodiments of the invention, it should be apparent that a 3D seismic Classification method for identifying prospective targets in asset evaluation that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A method of identifying drilling prospects, the method comprising the steps of:
    selecting a seismic volume of interest;
    generating different seismic attribute cubes for the seismic volume of interest;
    defining fluid-lithology classes based on correlation between seismic attributes, which correspond to the different seismic attribute cubes, and well production or log data;
    cross-plotting samples of the fluid-lithology classes having different seismic attributes to determine a set of seismic attributes that best differentiate hydrocarbon-bearing regions from non-hydrocarbon-bearing regions;
    defining a new class that represents a low-risk hydrocarbon class based on hydrocarbon-bearing classes in a cross plot;
    generating a class cube providing a spatial distribution of the fluid-lithology classes that include the new class; and
    selecting a drilling target based on the spatial distribution of the new class that represents the low-risk hydrocarbon class.

2. The method of claim 1, further including the step of labeling each of the fluid-lithology classes.

3. The method of claim 1 further including the step of deleting redundant attribute cubes.

4. The method of claim 1 wherein the new class is defined by using cross-plot discriminant analysis of a cluster distribution in the cross-plot.

5. The method of claim 1 further including the step of defining a location and extent of a prospective target using 3D visualization of the class cube.

6. The method of claim 1, wherein the step of selecting the drilling target includes Voxel interpretation of the at least one extra-class.

7. A method of identifying drilling prospects, the method comprising the steps of:
    selecting a seismic volume for evaluation;
    generating seismic attribute cubes for the seismic volume;
    defining fluid-lithology classes based on correlating the seismic attribute cubes with well logs or production data;
    generating a cross-plot of samples of the fluid-lithology classes;
    defining at least one extra class as a low-risk hydrocarbon class using cross-plot discriminant analysis of a cluster distribution in the cross-plot;
    generating a class cube providing a spatial distribution of the fluid-lithology classes that include the at least one extra class;
    defining a location and extent of a prospective target using 3D visualization of the class cube; and
    selecting a drilling target.

8. The method of claim 7 further including the step of labeling each of the fluid-lithology classes and the at least one extra-class.

9. The method of claim 7 further including the step of deleting redundant attribute cubes.

10. The method of claim 7 wherein the step of selecting the drilling target includes Voxel interpretation of the at least one extra-class.

* * * * *